United States Patent [19]
Harrington

[11] Patent Number: 5,619,233
[45] Date of Patent: Apr. 8, 1997

[54] BIDIRECTIONAL INK JET PRINTING WITH HEAD SIGNATURE REDUCTION

[75] Inventor: Steven J. Harrington, Holley, N.Y.

[73] Assignee: Xerox Corporation, Stamford, Conn.

[21] Appl. No.: 329,760

[22] Filed: Oct. 27, 1994

[51] Int. Cl.$^6$ .............................. B41J 23/00; B41J 19/30
[52] U.S. Cl. ................ 347/37; 347/40; 400/323
[58] Field of Search ................... 347/37, 40, 43; 346/139 R, 46; 400/323

[56] References Cited

U.S. PATENT DOCUMENTS

| | | | |
|---|---|---|---|
| 4,553,867 | 11/1985 | Nakai | 400/323 |
| 5,044,796 | 9/1991 | Lund | 400/323 |
| 5,511,890 | 4/1996 | Momose | 400/323 |

Primary Examiner—Benjamin R. Fuller
Assistant Examiner—Craig A. Hallacher
Attorney, Agent, or Firm—Mark Costello

[57] ABSTRACT

A method and apparatus for operating an ink jet printer of the type which prints a swath of the image at a time with each transit across a sheet. An image portion corresponding to a potential swath is examined, particularly determining for each column whether any breaks occur at any point in a relevant portion of the column. If no breaks are found in any single column, the swath and the next swath are printed unidirectionally. However, if breaks are found at acceptable locations in every column, the swath and the next swath can be printed bidirectionally. For each column, the pattern of bits in the column above the break points in each column are directed to the print buffer to be printed in the first swath, while the remaining bits will be sent to a buffer for the next swath. The distance for the next paper advance is calculated, considering the locations of the breakpoints.

18 Claims, 6 Drawing Sheets

BIDIRECTIONAL INK JET PRINTING WITH HEAD SIGNATURE REDUCTION

This invention relates to drop-on-demand ink jet printing systems and more particularly, to improvements in reproduction of images with a thermal ink jet printer adaptable to print in bidirectional swaths.

BACKGROUND OF THE INVENTION

Thermal ink jet printing is generally a drop-on-demand type of ink printing system which uses thermal energy to produce a vapor bubble in an ink filled channel that expels a droplet. A thermal energy generator or heating element, usually a resistor, is located in the channels near the nozzle a predetermined distance therefrom. The resistors are individually addressed with an electric pulse to momentarily vaporize the ink and form a bubble which expels an ink droplet. As the bubble grows, the ink bulges from the nozzle and is contained by the surface tension of the ink. As the bubble begins to collapse, the ink in the channel between the nozzle and the bubble starts to move toward the collapsing bubble, causing a volumetric contraction of the ink at the nozzle and resulting in separation of the bulging ink as a droplet. The acceleration of the ink out of the nozzle while the bubble is growing provides the momentum of the droplet which proceeds in a substantially straight line towards a recording medium, such as paper or transparencies, etc. (hereinafter, referred to as a "sheet"). Sheets are moved past the printhead for creation of the image.

In one type of ink jet device, a printhead including an array of several nozzles oriented parallel to the direction of sheet travel is moved across the recording medium in a direction perpendicular to the direction of sheet travel. Each transit prints a swath of spots or pixels across the page corresponding to an image. Most thermal ink jet printers print some number of scanlines in a swath, and the swath boundaries are visible in prints made thereby. The boundaries are visible because of ink flowing beyond the boundary of the array end (in the case of paper) or pulling away from the boundary of the array end due to surface tension (in the case of transparencies). In the former case a thin line along the boundary is more heavily inked; in the latter it is not inked at all.

It will be clear from the above description that printing can be accomplished in each transit of the head across the page, and for black (or monocolor) only printing, bidirectional printing is common. Speed of printing a page is at least partly a function of the number of scan lines that can be printed in a single transit across the page. In operation, an ink jet printer prints a number of scan lines in a first transit, relative motion between the printhead and sheet is provided to advance the printhead with respect to sheet, and then the ink jet head prints a second number of scan lines in a second transit. Bidirectional printing can greatly increase the speed of printing. Less common, is bidirectional printing for color ink jet system. Color ink jet printing is normally performed unidirectionally (left to right or right to left, not both). Multiple nozzle arrays arranged in parallel may be provided to print with multiple inks printing plural separations. One particular type of color ink jet printer has a single head (corresponding to an array of nozzles) per color, with four heads mounted one behind the other on the carriage, so that all four colors cyan, magenta, yellow and black of all scanlines in a swath are printed in a single pass, with a fixed order for the separations within a pixel. U.S. patent application Ser. No. 08/208,556, entitled "Bidirectional Color Ink Jet Printing with Head Signature Reduction", by R. V. Klassen, details such a device with bidirectional operation.

Due to the large number of variables in carriage movement and ink deposit, a forward transit cannot match a return transit precisely. Slight discontinuities occur between bidirectional swaths. If, for example, a line is printed on a page arranged parallel to the ink jet array, with a length bridging one or more swaths, and bidirectional printing is used, the line will be slightly offset from swath to swath. As detailed in U.S. Pat. No. 5,044,796 to Lund, image quality concerns occasionally suggest that certain swaths should be printed unidirectionally. Data forming a swath is checked for breaks, i.e., white areas, or no structures bridging the line. If such an area is found, and it is more than about ¾ of the printhead height, then only the data down to the break is imaged, and the remaining data is printed in the next swath. The reverse transit of the head always occurs at a break.

As a printhead becomes larger however, which is desirable from a speed point of view, it becomes more difficult to find breaks in the document. The result is that more and more swaths are printed unidirectionally, resulting in failing to take advantage of the potential speed advantage offered by the larger printhead.

References disclosed herein are incorporated by reference for their teachings.

SUMMARY OF THE INVENTION

The present invention is directed to a method of using an ink jet printer of the type which prints a swath of the image at a time with each transit across a sheet to print images with a substantially reduced bidirectional printing artifact.

In accordance with one aspect of the invention there are provided method and apparatus for operating an ink jet printer of the type which prints a swath of the image at a time with a transit across a sheet, optionally printing swaths either unidirectionally or bidirectionally. An image portion corresponding to a potential swath is examined, particularly determining for each column whether any breaks occur at any point in the column. If no breaks are found in any single column, the swath and the next swath are printed unidirectionally. However, if breaks are found at acceptable locations in every column, the swath and the next swath can be printed bidirectionally. For each column, the pattern of bits in the column above the break points in each column are directed to the print buffer to be printed in the first swath, while the remaining bits will be sent to a buffer for the next swath. The distance for the next paper advance is calculated, considering the locations of the breakpoints.

The present invention seeks to utilize bidirectional printing as often as possible. The described process will print bidirectional, unless there is an image structure bridging the entire relevant portion of the swath. This is accomplished by an adaptive breaking determination, which looks to column breaks rather than row breaks.

A more complete understanding of the present invention can be obtained by considering the following detailed description in conjunction with the accompanying drawings in which.

DESCRIPTION OF THE PREFERRED EMBODIMENT

Figure 1:
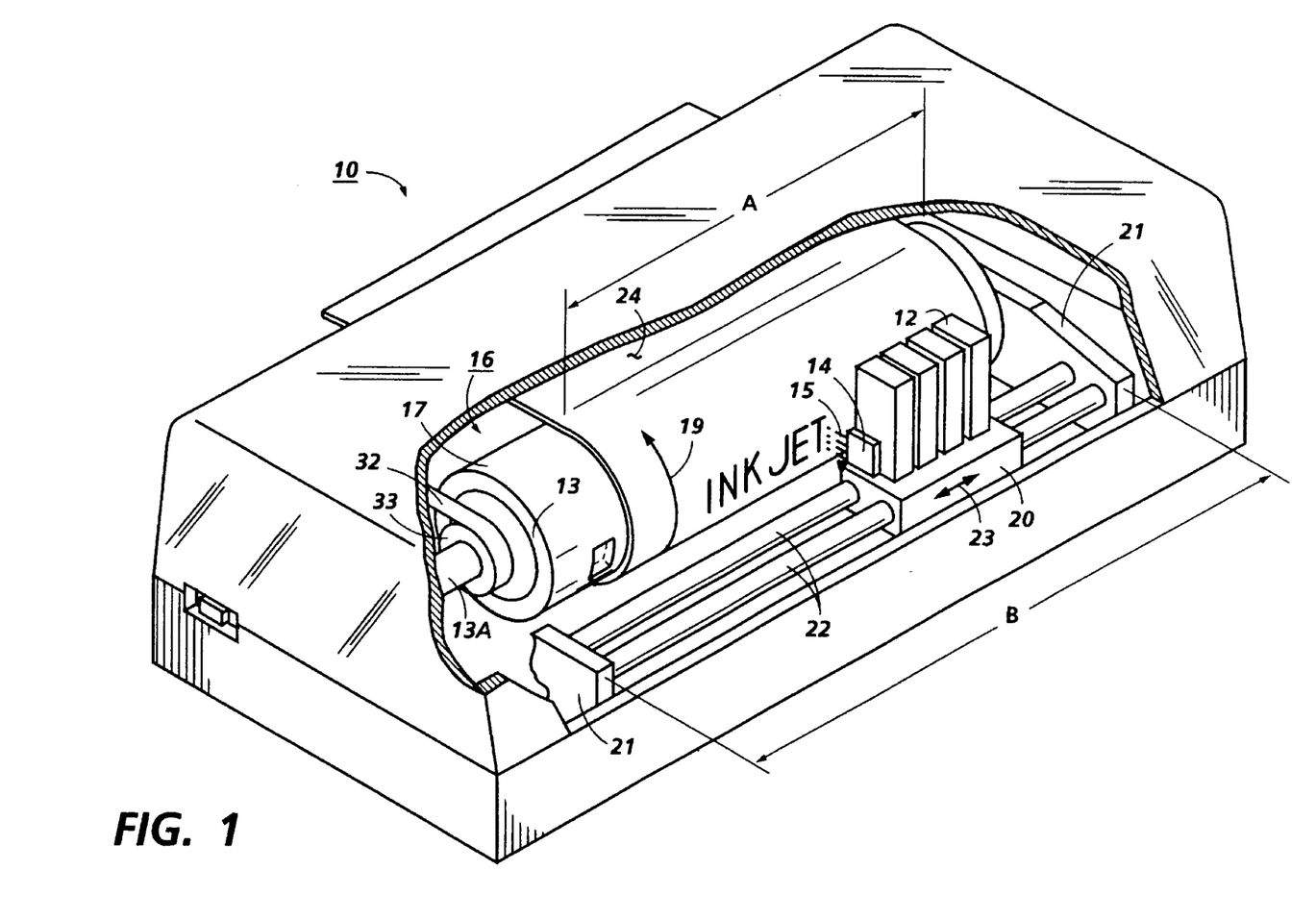
FIG. 1 is a schematic isometric view of a multi-color, carriage type, thermal ink jet printer containing the present invention printing plural separations in swaths across a sheet supported on a platen.

With reference now to the drawings, where the showings are for the purpose of illustrating an embodiment of the invention and not for limiting same, in FIG. 1, a multi-color thermal ink jet printer 10 is shown containing several disposable ink supply cartridges 12, each with an integrally attached printhead 14. The ink cartridge and printhead combination are removably mounted on a translatable carriage 20. During the printing mode, the carriage reciprocates back and forth on, for example, guide rails 22, parallel to the recording medium or sheet 24 as depicted by arrow 23. The end-to-end travel distance of the carriage and printheads is shown as distance B. The carriage is driven back and forth across the length of a cylindrical platen 16 by well known means such as, for example, by cable and pulley with a reversible motor (not shown). A recording medium such as, for example, paper is mounted to platen 16. The platen has a diameter of between 10 and 20 cm and is constructed, for example, out of aluminum sleeve 17 with end caps 13 containing a shaft 13A there through which has a pulley 33 mounted on one end and driven via a stepper motor (not shown) by belt 32. The platen is rotatably mounted in frame sides 21 which also contain the ends of guide rails 22. The paper is held stationary by the platen while the carriage is moving in one direction. Prior to the carriage moving in the reverse direction, the paper is stepped by the platen in the direction of arrow 19 a distance equal to the height of the swath of data printed thereon by the printheads 14 during transversal in one direction across the paper. The width of the sheet is the printing zone or region during the carriage transit and is indicated as distance A. To enable printing by all of the plurality of printheads and to accommodate printhead priming and maintenance stations (not shown), the overall travel distance B is larger than the printing region A. Thus, an encoder (not shown) must be used to monitor the position of the carriage 20 when the printheads are in the printing region. Droplets are ejected on demand from nozzles (not shown) located in the front faces (not shown) of the printheads along the trajectories 15 to the sheet. The front face of the printhead is spaced from the sheet a distance of between 0.01 and 0.1 inch, with the preferred distance being about 0.02 inches. The stepping tolerance of the platen drum 16, the sheet, and the linear deviation of the printheads are held within acceptable limits to permit contiguous swaths of information to be printed without gaps or overlaps.

Each cartridge 12 contains a different ink, typically one black and one or more cartridges of different selected colors. The combined cartridge and printhead is removed and discarded after the ink supply in the cartridge has been depleted. In this environment, some of the nozzles do not eject droplets during one complete carriage traversal and generally, none of the nozzles eject droplets as the printheads move beyond the edge of the platen. While at this end of the carriage transit, there is a small dwell time while the platen drum is being stepped one swath in height in the direction of arrow 19. A maintenance and priming station (not shown) is located on one side of the platen drum where the lesser used nozzles may fire nozzle-clearing droplets, and/or where the nozzles may be capped to prevent them from drying out during idle time when the printer is not being used.

Figure 2:
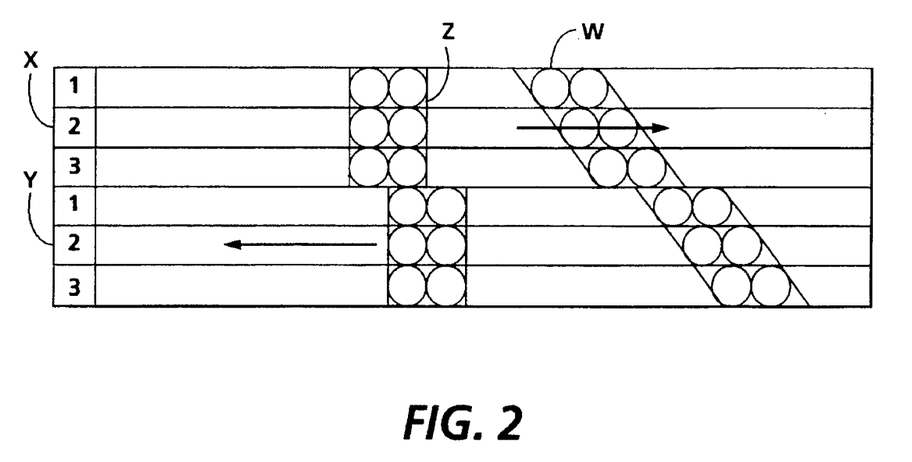
FIG. 2 illustrates the printing defect noted in bidirectional swath printing.

For the purposes of this invention, a color printer and a monocolor printer have essentially identical operations. Both produce the characteristic image defect shown in FIG. 2, when lines bridging bidirectional swaths are printed. In the example of FIG. 2, first and second swaths X and Y are shown. Each swath includes in this simplistic example, 3 scan lines. A line Z, formed by a more or less vertical structure (or at least a vertical component extending over a plurality of scan lines) will be slightly offset at the swath boundary. It will be noted that every scan line has a corresponding number of pixels N, and a vertical structure is defined by pixels at vertically corresponding positions in a plurality of sequential scan lines. Note however, "vertically corresponding" does not necessarily mean exclusively vertical, as shown by image structure W.

Figure 3:
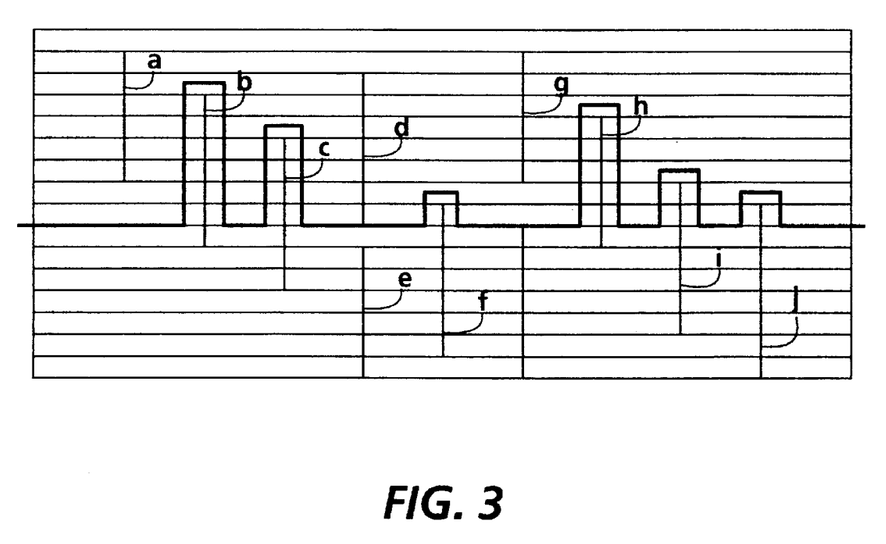
FIG. 3 illustrates the possible printing format of the illustrated image with the present invention.

With reference now to FIGS. 3–6, the principle of the invention will be illustrated. FIG. 3 shows an image formed with 16 scan lines to be printed, the image including several vertical image structures a–j. For illustration purposes it will be assumed that this image occurs near a swath boundary. While the size of the printhead is irrelevant, it will be assumed for discussion that it has 128 nozzles. As in U.S. Pat. No. 5,044,796 to Lund, bidirectional printing only provides advantage if it can be done without overlapping too many scanlines. The fraction of the swath near enough to the boundary to provide an advantageous break for bidirectional printing will be referred to as the relevant portion (e.g. the bottom quarter of the swath).

Initially the relevant portion of each column in the swath is examined, to see if each column has a break, or white space occurring somewhere therein. If a column exists without a break, the offset artifact cannot be avoided in bidirectional printing, and accordingly, the image must be printed unidirectionally. The image illustrated in FIG. 3 provides at least one break in each column.

Figure 4:
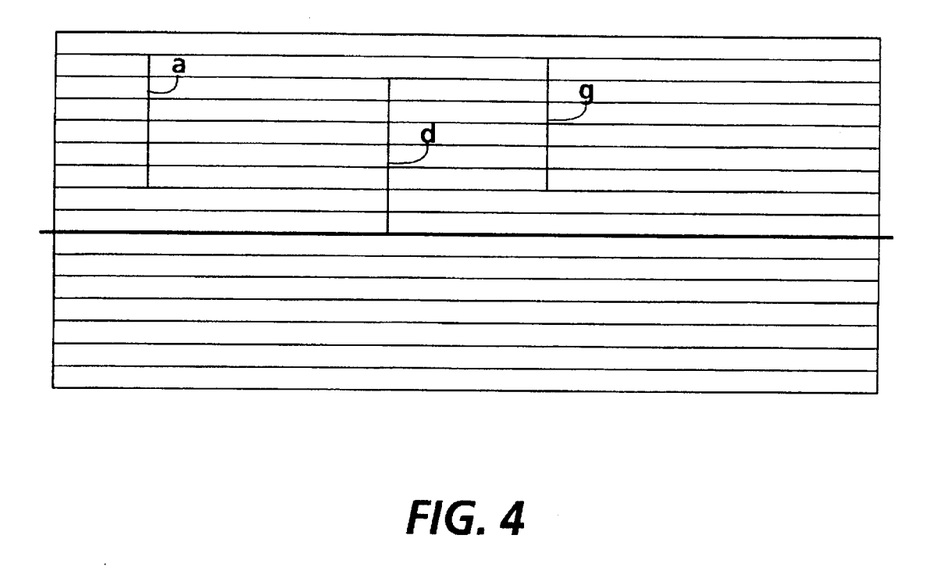
FIGS. 4 and 5 illustrate the composition of each swath forming the image of FIG. 3.
Figure 5:
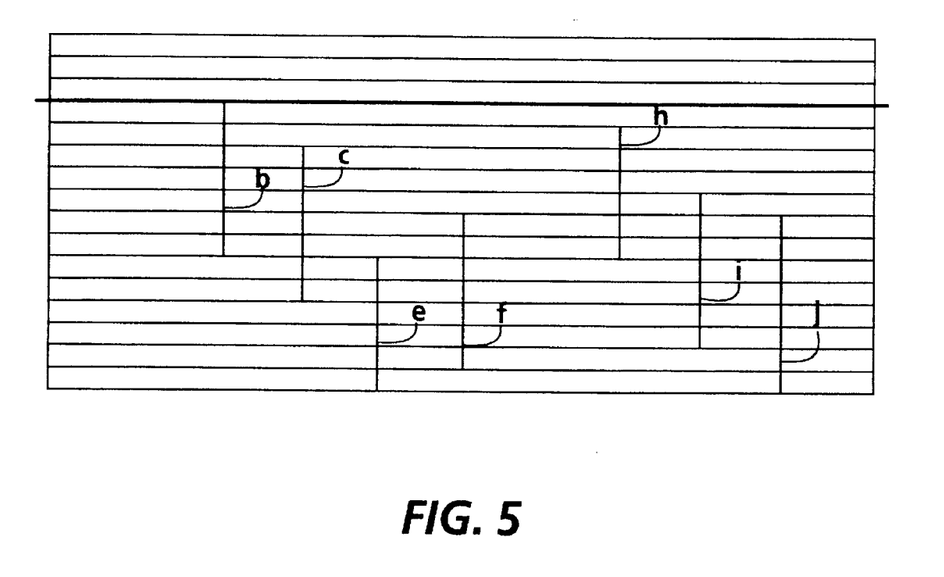
Figure 6:
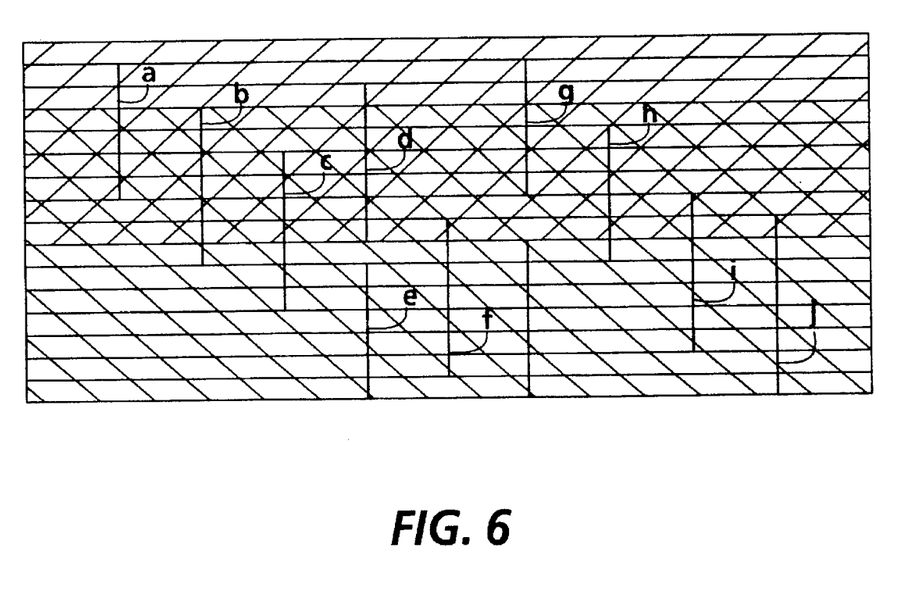
FIG. 6 illustrates the overlap required to print the image of FIG. 3 with the present invention.

Next, if a valid break point determination is made, each column is masked so that only the data above the break is included. A version of the image is generated including only those columns where all the data is completely above the break between lines d and e, as shown in FIG. 4. The remaining data, illustrated in FIG. 5, is saved, and directed to be stored for printing in the next swath.

Next, a calculation is made that determines the sheet advance. The sheet advance accounts for overlapping scanlines or swath portions, illustrated in FIG. 6. If there were no bridging image elements, a new swath could begin every 128 lines. However, the example of FIGS. 3–6 shows that the next swath must overlap the previous swath by 6 scan lines, so the sheet can only be advanced no more than 122 scan lines. If, in the example, the overlap was more than 32 scanlines, the page would be printed unidirectionally, so that the artifact would not occur. In such a case, there would be no swath overlap required.

Figure 7:
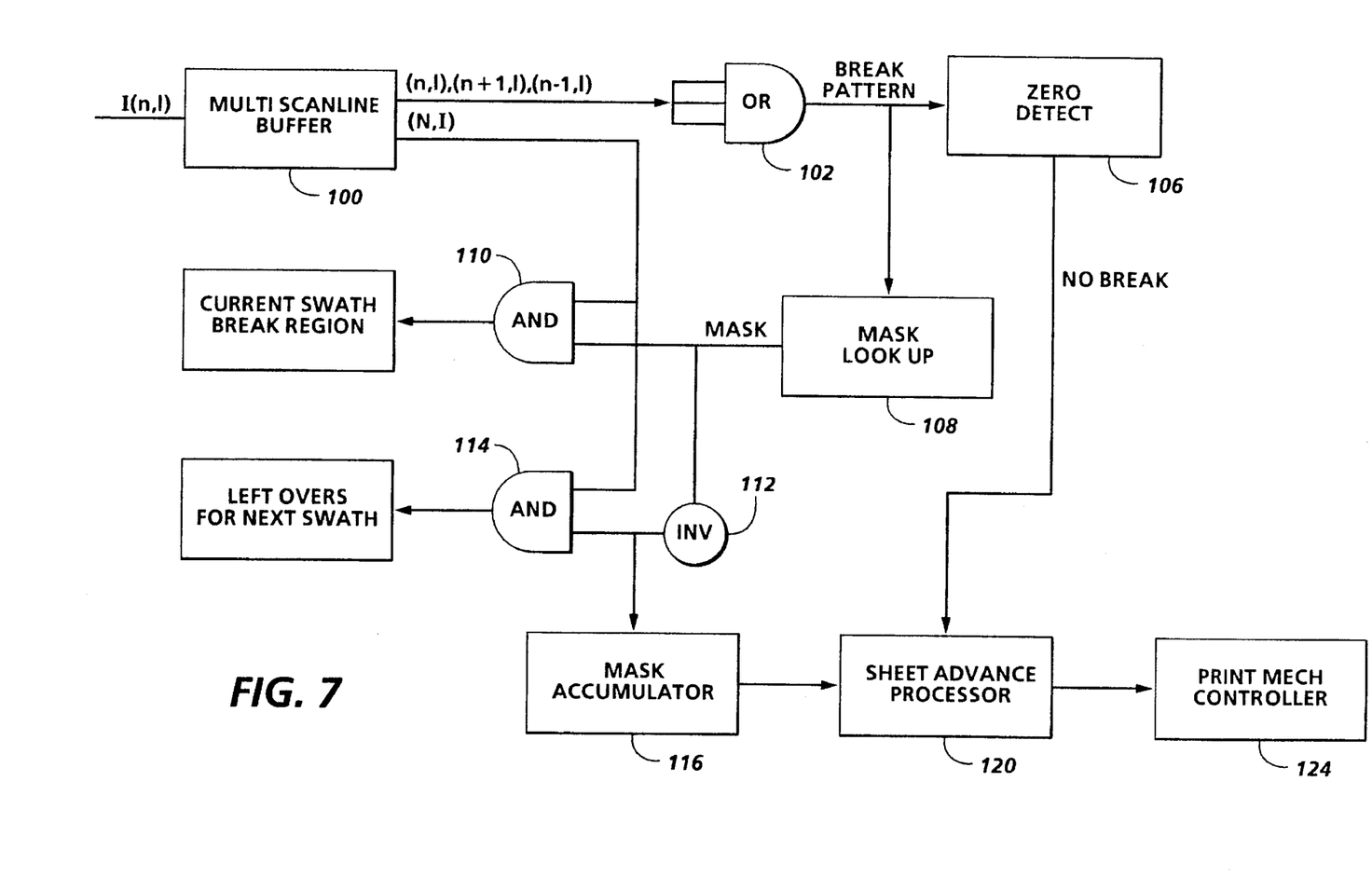
FIG. 7 is a schematic block diagram illustrating the control arrangement of an ink jet printer operating in accordance with the present invention.

Turning now to FIG. 7, an embodiment of the invention is illustrated in highly schematic form. Initially, a multi scanline swath of an image is stored to multi scanline buffer 100, having a size sufficient to provide data for a full swath of the printhead. The number of scan lines of data will correspond to the number of jets in the printhead. For a portion of that data adjacent to the bottom of the swath, perhaps the bottom 25% of the scan lines, initially a determination will be made to see if there are any breaks in the data. This is done by forming a break pattern signal, resulting from logically ORing together at OR gate 102 the bit patterns for a current column of pixel, the next n columns of pixels and the previous n'columns of pixels. For simple graphics and text, n and n'=1 (although n is not required to equal n'). In halftone areas, a larger value of n such as 3 or 4 may be required. For each pixel, the result of the logical OR function (the "break pattern") is stored to zero detector 106, which detects whether a break exists in each column of the relevant region. If a break is not indicated, a signal is directed to sheet advance processor 120 that bidirectional printing is not appropriate. The break pattern is also directed to a mask lookup table 108, which stores information on the location of the breaks, in order to generate a mask signal. The mask signal is conveniently a binary signal which indicates which portions of the swath should be printed in the first bidirectional pass. The generated mask signal is logically ANDed at AND gate 110 with the swath stored in the buffer to produce the image data for first swath. The mask is inverted at inverter 112 to generate a inverse mask describing the leftover portion of the swath. The inversed mask signal is conveniently a binary signal which indicates which portions of the swath should be printed in the second bidirectional pass. That inverse mask signal is then logically ANDed at AND gate 114 with the swath stored in the buffer to produce the "leftover" portion of the swath to be printed with the next swath. The inverse mask signal is also directed to the mask accumulator 116 which determines from that signal how many scan lines are in the leftover swath portion. This information is directed to the sheet advance processor 120 and used in to address a lookup table storing corresponding sheet advance signals. The sheet advance calculation result is directed to the ink jet machine controller 124, to control the sheet driving systems or motors. Once again, provision is made that if no break is detected at zero detector, a full swath can be printed without overlap.

Figure 8:
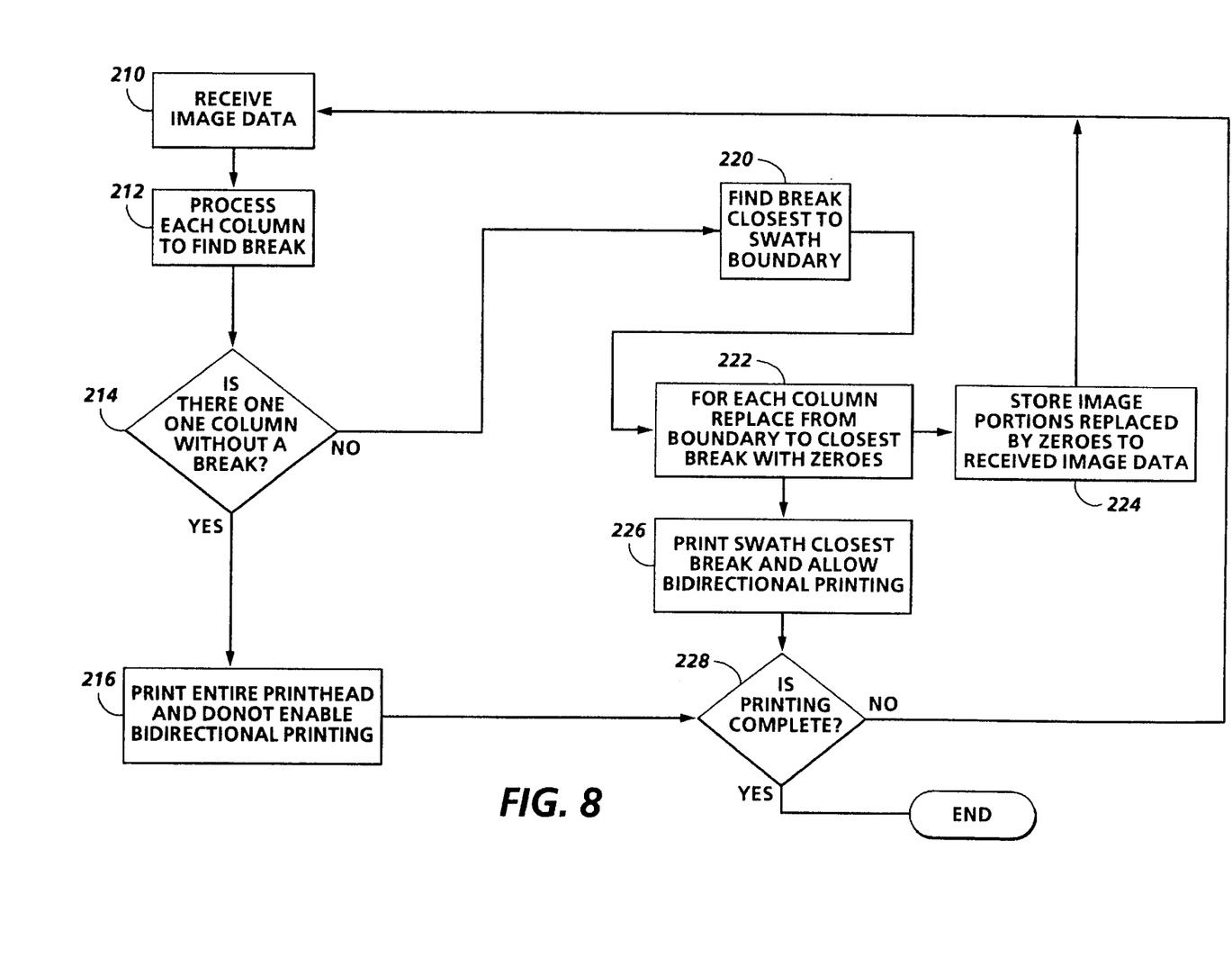
FIG. 8 illustrates a flow chart of the inventive process.

At FIG. 8, a simplified flow chart is illustrated. Data is received at step 210. Each column's last quarter is processed to find breaks at step 212. At decision 214, if there is any column without breaks, the swath is printed unidirectionally at step 216. If there are no breaks in the relevant area, then the swath is printed unidirectionally at step 216. If there are breaks in the relevant area, then the break closest to the swath boundary is determined at step 220. Then, at each column, the portion of the column from the column break to the scan line in which the closest break occurs is filled with zeros, or masked to replace pixels with background; at step 222. At step 224, image portions that are replaced by zeros are stored for use in the next swath. At step 226, the swath is printed to the closest break, and allowing bidirectional printing. At step 228, printing is continued until completed, by processing the next swath if one exist.

It will no doubt be appreciated that the invention can be accomplished with a hardware logic implementation thereof, or a software implementation on a programmable processing device, or a combination of hardware and software.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A method for controlling an ink jet printer having a reciprocable printhead to print swaths of an image with either unidirectional or bidirectional transits across a sheet, optimizing reproduction of images with vertical structures bridging successive swaths on a background, steps of including the:
    a) receiving at an image input a set of signals representing pixels in plural scan lines forming a first swath of the image, wherein pixels at corresponding locations in each of the plural scan lines form columns of pixels;
    b) locating breaks in vertical image structures in each column of pixels within a relevant portion of the swath, wherein the relevant portion of the swath includes those scan lines a predetermined distance from a boundary of the received swath with a next swath;
    c) from the located break in each column of pixels to the swath boundary, replacing pixels in said swath with pixels forming said background, to form a print image;
    d) storing the replaced portion of the swath, complementary to a portion used to form the print image, for subsequent combination with the next swath;
    e) controlling the reciprocable printhead to print a swath of the image with the said print image during a forward bidirectional transit of the printhead across the sheet;
    f) controlling the printhead to print a swath of the image including said data stored for subsequent combination with a return bidirectional reverse transit of the printhead across the sheet, said return swath at least partially overlapping the printed forward bidirectional swath.

2. The method as described in claim 1, wherein the received set of signals includes pixels in a plurality of scan lines, said number of scan lines corresponding to a number of jets in the ink jet heads.

3. The method as described in claim 1, wherein the locating of breaks in vertical structure includes a process where for each pixel at location n in a scan line, where n is the position of a pixel in order in the scan line, the pixel is logically ORed at least with pixels at location n−1 and n+1, with a process output indicating either vertical structure or background.

4. The method as described in claim 1, wherein the predetermined distance corresponds to approximately 25% of the scan lines in a swath.

5. The method as described in claim 1, wherein the at least partial overlapping of the return swath of the printed forward bidirectional swath is determined by the distance from a located break furthest from the swath boundary to the swath boundary.

6. The method as described in claim 1, wherein if no breaks are located at b), the reciprocable printhead is controlled to print a current swath and a next swath in unidirectional transits of the printhead across the sheet.

7. A device for controlling an ink jet printer having a reciprocable printhead to print swaths of an image with either unidirectional or bidirectional transits across a sheet, optimizing reproduction of images with vertical structures bridging successive swaths on a background, including:
    a) means for receiving at an image input a set of signals representing pixels in plural scan lines forming a first swath of the image, wherein pixels at corresponding locations in each of the plural scan lines form columns of pixels;
    b) means for locating breaks in vertical image structures in each column of pixels within a relevant portion of the swath, wherein the relevant portion of the swath includes those scan lines a predetermined distance from a boundary of the received swath with a next swath;

c) means for replacing pixels in said swath with pixels forming background, from the located break in each column of pixels to the swath boundary, to form a print image;

d) means for storing the replaced portion of the swath, complementary to a portion used to form the print image, for subsequent combination with the next swath;

e) means for controlling the reciprocable printhead to print a first swath of the image with the said print image during a forward bidirectional transit of the printhead across the sheet and to print a second swath of the image including said data stored for subsequent combination with a return bidirectional reverse transit of the printhead across the sheet, said return swath at least partially overlapping the printed forward bidirectional swath.

8. The device as described in claim 7, wherein the received set of signals includes pixels in a plurality of scan lines, said number of scan lines corresponding to a number of jets in the ink jet heads.

9. The device as described in claim 7, wherein said means for locating of breaks in vertical structure includes a logical processing means, where for each pixel at location n in a scan line where n is a position of the pixel in order in the scan line, the pixel is logically ORed at least with pixels at location n−1 and n+1, with a process output indicating either vertical structure or background.

10. The device as described in claim 7, wherein the predetermined distance corresponds to approximately 25% of the scan lines in a swath.

11. The device as described in claim 7, wherein said means controlling the reciprocable printhead determined partial overlap amount from the distance from a located break furthest from the swath boundary to the swath boundary.

12. The device as described in claim 7, wherein if said means for locating breaks fails to find a break, it directs a control signal to said means for controlling the reciprocable printhead, indicating that a current swath and a next swath are to be printed in unidirectional transits of the printhead across the sheet.

13. An ink jet printer having a reciprocable printhead to print swaths of an image with either unidirectional or bidirectional transits across a sheet, and including a swath processor optimizing reproduction of images with vertical structures bridging successive swaths on a background, including:

a) an image input at which a set of image signals are received representing pixels in plural scan lines forming a first swath of the image, wherein pixels at corresponding locations in each of the plural scan lines form columns of pixels;

b) a swath buffer, storing a plurality of scan lines of image data received at the image input;

c) a logical processor, operating on the stored swath to locate column breaks, and producing a signal indicating vertical structure and breaks;

d) a mask signal generator, responsive to said logical processor signal indicating breaks, to replace the logical processor signals in a column for which a break signal occurs with background signals in a mask signal;

e) means for storing replaced signals to a temporary buffer for combination with additional data forming a reverse bidirectional transit swath;

f) a mask logic processor, logically ANDing signals received at the image input with the mask signal to generate a first swath signal;

g) a printhead controller, responsive to said data from said mask processor to print a first swath of the image with the said print image during a forward bidirectional transit of the printhead across the sheet and to subsequently printing a second swath of the image including data in said storing means.

14. The device as described in claim 13, wherein the received set of signals includes pixels in a plurality of scan lines, said number of scan lines corresponding to a number of jets in the ink jet heads.

15. The device as described in claim 13, wherein said logical processor includes an OR gate, where for each pixel at location n in a scan line, where n is the position of the pixel in order in the scan line, the pixel is logically ORed at least with pixels at location n−1 and n+1, with a process output indicating either vertical structure or background.

16. The device as described in claim 13, wherein the predetermined distance corresponds to approximately 25% of the scan lines in a swath.

17. The device as described in claim 13, wherein said means controlling the reciprocable printhead includes an overlap processor, determining for the bidirection reverse transity a partial overlap amount from the logical processor signal.

18. The device as described in claim 13, wherein if said logical processor signal does not indicate a break, the printhead controller responds by printing a current swath and a next swath are to be printed in unidirectional transits of the printhead across the sheet.

* * * * *